United States Patent

[11] 3,599,049

| [72] | Inventor | Robert A. Barnard<br>Vancouver, Wash. |
|---|---|---|
| [21] | Appl. No. | 820,483 |
| [22] | Filed | Apr. 30, 1969 |
| [45] | Patented | Aug. 10, 1971 |
| [73] | Assignee | Syndyne Corporation<br>Vancouver, Wash. |

[54] DUAL-POLARITY ELECTRONIC SWITCH
1 Claim, 1 Drawing Fig.

| [52] | U.S. Cl. | 317/133.5,<br>317/148.5 R, 340/228 R |
|---|---|---|
| [51] | Int. Cl. | H01h 47/26 |
| [50] | Field of Search | 317/148.5,<br>133.5; 340/228 |

[56] References Cited
UNITED STATES PATENTS
3,131,314  4/1964  Charlot, Jr. .................. 317/133.5 X OTHER REFERENCES
Electronic Design, Nov. 1, 1956, page 25

*Primary Examiner*—Lee T. Hix

ABSTRACT: An electronic switch responding to the closure of the contacts of a meter relay operated by a grounded junction thermocouple, the switch containing a switching amplifier so that the device is actuated by a flow of current through the meter relay contacts which is too small to cause a noticeable change in the meter reading, and containing a dual-polarity gate arranged so that the switch is operable if the thermocouple junction is grounded to the positive or to the negative side of the battery power source.

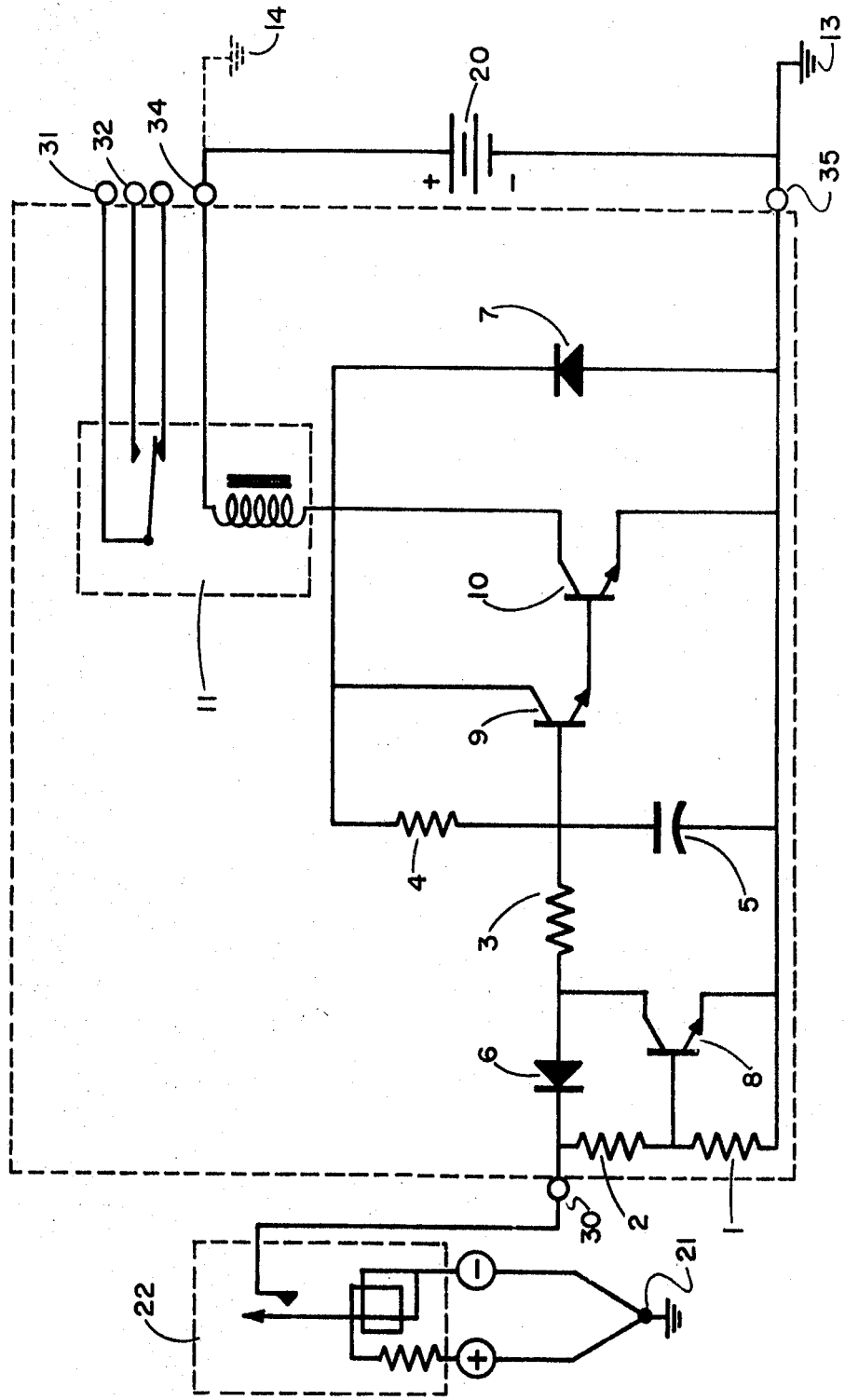

DUAL-POLARITY ELECTRONIC SWITCH

BODY OF SPECIFICATION

A Thermocouple, when connected to an electric meter, is an effective and much used means of determining the exhaust gas operating temperature of a diesel engine. If it is desired that control equipment or warning equipment be actuated when the engine temperature exceeds safe limits, the thermocouple may be connected to a meter relay. Since the contacts in the meter relay are far too delicate to carry the current which would have to be drawn to operate a warning light, the closing of the meter relay contacts must be used indirectly to control the operation of a switching device capable of handling the current drawn by a warning light or other desired equipment. If the thermocouple probe and the meter relay are to be of the simplest and most effective types, the design of the switching device must deal with problems of electrical grounding as shown below.

In the cheapest and most common type or sensitive meter relay, the relay contacts consist of an adjustable stationary contact mounted on the meter housing, and a moving contact which is part of the rotatable meter armature. The moving contact is electrically connected to the actuating coil wound on the meter armature, because of the difficulty of attempting to attach a third electrical connection, , in addition to the two coil connections, to the sensitive and delicate armature. The sturdiest and most rapidly responding type of thermocouple probe used to measure exhaust gas temperatures has a grounded heat-resistant metal sheath, for durability, to which the thermocouple junction is welded at the hot end, for maximum heat conductivity and fast response.

The circuit loop consisting of the meter coil, thermocouple leads, and thermocouple junction is therefore grounded at the junction, and it is with this loop that the stationary contact of the meter relay is brought into contact when the meter armature is rotated to the position corresponding to the temperature setting of the meter relay. Any current flowing from the stationary contact must traverse at least the length of one of the two leads of the thermocouple before it reaches ground. Since the voltage output of a thermocouple is only in the range of 25 millivolts, and since the resistance of a long thermocouple lead may easily reach 4 ohms, the flow of current from the stationary contact of the relay must be very small, or else it will introduce a voltage drop in one of the thermocouple leads sufficient to cause significant error in the meter reading. A current of one-fourth milliampere, for instance, would be sufficient, given the figures mentioned above, to cause a 4 percent error in the meter reading. A switching device which is used with a grounded junction thermocouple and a meter relay of the kind described above must therefore operate while sending only a very small current through the meter relay contacts.

A further difficulty, related to grounding, arises from the fact that diesel engine manufactures build some engines with a positive electrical ground, and some with a negative electrical ground. If one wishes to build a temperature-signalling device which is useable on all engines, it must therefore be effective whether the engine electrical system has a positive or a negative ground.

I have invented a simple electronic switch, controllable by a thermocouple and meter relay of the type described, which solves the problems described above, and which can also be arranged to have other desireable properties of such a switch: It is not affected by mechanical vibration and contact bounce (a common problem with simple meter relays) and it may be so constructed as to momentarily actuate the equipment controlled by it when battery power is simultaneously supplied to the electronic switch and to the controlled equipment, as for example by the turning on of the ignition of a diesel engine on which the temperature-monitoring system is installed. Such momentary actuation of the controlled equipment is sometimes very desirable, for instance in providing indication of a burned out overtemperature warning light.

The figure is a circuit diagram of an embodiment of the invention. All semiconductors are silicon. The component values are not critical, but for concreteness will be considered to be the following:

Resistor 1, 50 kiloohms;
resistor 2, 500 kiloohms;
resistor 3, 3 kiloohms;
resistor 4, 500 kiloohms;
capacitor 5, 20 microfarads;
diode 6, 1N 3755;
diode 7, 1N 3755;
transistor 8, 2N 3394
transistor 9, 2N 3394;
transistor 10, 2N 3394; and
relay 11, 12 volt, 1,000 ohms, single pole double throw.

The power supply, 20, is a 12-volt automotive battery grounded either at point 13 (negative ground) or at point 14 (positive ground).

The grounded junction thermocouple 21 (for example, a chromel-alumel thermocouple with lead resistance of about 5 ohms) operates meter relay 22, the relay contacts closing when the thermocouple reaches a temperature, for example, 1,000° F., determined by the position of the stationary contact of the relay.

The operation of the switch is as follows: with terminal 30 ungrounded, transistors 9 and 10 are on, the voltage drop across the relay 11 is about 11 volts, and the relay is actuated, so terminals 31 and 32 are normally open. The voltage at the base of transistor 8 is very low, so transistor 8 is off.

When the meter relay contacts are closed, and if the battery is negatively grounded at point 13, then terminal 30 is within a few millivolts of ground potential (depending on the thermal E.M.F. between the negative leg of the thermocouple and the sheath material to which the thermocouple junction is welded), diode 6 conducts, the voltage at the base of the Darlington pair, transistors 9 and 10, is below cutoff, so transistors 9 and 10 do not conduct, relay 11 is not actuated, and relay terminals 31 and 32 are closed.

When the meter relay contacts are closed, and the battery is positively grounded at point 14, then terminal 30 is about 12 volts positive with respect to the emitter of transistor 8. Transistor 8 conducts, diode 6 blocks the flow of current from terminal 30 to the collector of transistor 8, the voltage across the capacitor 5 is below the cutoff voltage of the Darlington pair, transistors 9 and 10, and again the relay is not actuated.

When the battery has a negative ground, the maximum possible current flow through terminal 30, when the meter relay contacts are closed, is equal to the current through resistor 4 at 12 volts, or 24 microamperes. This current flows to ground partly through the negative thermocouple lead, and partly through the positive thermocouple lead and the coil of the meter. The resistance of the meter, with its calibration resistor, is of the order of 50 ohms, and the resistance of each thermocouple lead is of the order of 2 ohms, so most of the 24 microamperes flows to ground through the negative lead of the thermocouple. This current flowing through the thermocouple lead resistance produces a voltage drop of the order of 50 microvolts, which is about one-fifth of 1 percent of the 25 to 50 millivolts normally across the meter at thermocouple temperatures of interest. Current flow through terminal 30, therefore, has no noticeable effect on the accuracy of the reading of the meter relay, when the thermocouple is connected to the negative side of the battery.

An exactly similar argument yields the same result, when the thermocouple is grounded to the positive side of the battery, except that in this case the maximum 24-microampere current is determined by resistor 2 instead of resistor 4.

Capacitor 5 has two functions. In combination with resistor 3 it limits the effect of meter relay contact bounce and chatter due to mechanical vibration, by preventing sudden voltage swings at the base of transistor 9. In combination with resistor 4, it holds transistors 9 and 10, and consequently also the relay, off for about 1 second after battery power is applied to the switch and to the circuits controlled by the relay contacts 31 and 32. Power therefore momentarily flows in the circuits controlled by these contacts, and the momentary operation of these circuits shows whether they are in working order or not.

When the meter relay closes, a momentary current will flow through the thermocouple leads from resistor 3 and capacitor 5, of about one-third milliampere, sufficient to cause a temporary change of about one-half millivolt in the meter reading (or about 2 percent of the total voltage across the meter), but this voltage change, which last less than one-tenth second, is not objectionable.

Diode 7 prevents the collector voltage of transistors 9 and 10 from dropping below the emitter voltage of transistor 10. The diode is needed because, if current through the relay coil is stopped by sudden turnoff of transistors 9 and 10, inductive surge could cause a dangerously large negative voltage to appear on the collectors of these transistors.

The electronic switch described above can be conveniently thought of as composed of two parts. The first part is a dual polarity gate (diode 6, transistor 8, resistors 1, 2, 3, and capacitor 5) whose output connections have a low resistance to current flow toward the negative battery terminal when a small current flows in either direction through the input terminals, but have a high resistance to current flow when there is no current flow in the input terminals. The gate also includes the integrating network consisting of resistor 3 and capacitor 5. The input terminals of this gate are 30 and 35, and the output terminals are 35 and the junction of resistor 3 and capacitor 5 with resistor 4 and transistor 9. The second part of the switch is a switching amplifier (the relay 11, transistors 9 and 10, and resistor 4) which, though draining only very small currents through its input connection at the base of transistor 9, can control large currents and voltages at its output terminals 31 and 32. The input terminals of this switching amplifier are the same as the output terminals of the gate, and the output terminals of the amplifier are 31 and 32.

Evidently the switching amplifier shown in the figure is only one of many which could be used. For instance, the relay could be replaced by a silicon-controlled rectifier or a transistor, or the Darlington transistor pair could be replaced by a single transistor, or by an integrated circuit.

Similarly, the dual-polarity gate could be built without the integrating network if desired, among other possible changes.

The electronic switch may be used in conjunction with sensing equipment other than thermocouples and meter relays.

It is desirable, when marketing accessory equipment in such fields as the automotive and marine fields, that the equipment be operable in DC electrical systems which have grounds of either polarity. Some accessories, of which the temperature-sensing equipment described above is an example, are advantageously designed to require that the grounding of some component, possibly a delicate electrical contact, result in the operation of warning or control equipment. I know of a moisture sensor (used in the automatic control of convertible tops) and of a water level detector (used in the monitoring of water level in truck radiators) which are of this type. The dual-polarity electronic switch which I have invented makes it possible for equipment into which it is designed, of the type described, to be used without modification with DC electrical power supply systems of either ground polarity.

Normally it is necessary that a meter relay be followed by a switching amplifier in any application, because of the low current-handling capability of most meter relay contacts. Such a switching amplifier may typically be a relay drawing 5 or 10 milliamperes through the meter relay contacts. However, I do not know of any previous instance in which a meter relay of the type described has been used with a grounded junction thermocouple and with the switching amplifier following the meter relay being powered by the power supply circuit to which the thermocouple junction is grounded. In order to use such an arrangement, without introducing serious errors into the meter reading as described above, the switching amplifier used must be of a type which draws only a small fraction of milliampere, instead of the above-mentioned 5 to 10 milliamperes, through the meter relay contacts. I do not know of any previous instance in which such a switching amplifier has been used with a meter relay for a purpose resembling that described.

I claim:

1. An electronic switching device, in association with a direct current power source having two terminals, comprising:

a gate having two input terminals, two output terminals, a first state characterized by the existence of a high internal electrical resistance between said two output terminals, and a second state characterized by the existence of a low internal electrical resistance between said two output terminals, said gate being in said first state when there is no external current flow between said two input terminals, said gate being in said second state when one of said input terminals is connected to one of said power source terminals and the other of said input terminals is also connected to one of said power source terminals, and a switching amplifier having two amplifier input terminals, two amplifier output terminals, a first amplifier state characterized by a high internal resistance to current flow between said amplifier output terminals, and a second amplifier state characterized by a low internal resistance to current flow between said amplifier output terminals, said switching amplifier being in one of said amplifier states when there is no external current flow between said amplifier input terminals, said switching amplifier being in the other of said two amplifier states when there is a low external resistance to current flow between said two amplifier input terminals, one of said gate output terminals being connected to one of said amplifier input terminals, and the other of said gate output terminals being connected to the other of said amplifier input terminals, and the steady-state current flow through said gate input terminals being less than 200 microamperes when said gate is in said second state, said gate comprising in part a diode having two terminals, one of said diode terminals being connected to one of said gate input terminals, a resistor having two terminals, one of said resistor terminals being connected to said one of said gate input terminals, and a transistor having a base terminal, an emitter terminal, and a collector terminal, the other of said resistor terminals being connected to said base terminal, the other of said diode terminals being connected to said collector terminal, and the other of said gate input terminals being connected to said emitter terminal.